(12) United States Patent
Mazurkiewicz et al.

(10) Patent No.: US 7,999,992 B2
(45) Date of Patent: Aug. 16, 2011

(54) CHARGE CONDUCTING MEDIUM

(75) Inventors: Jakub Henryk Mazurkiewicz, Seaview Downs (AU); Gordon George Wallace, Wollongong (AU); Charles Peter Innis, Mangerton (AU); Scott A. Edwards, Broadview (AU); Peter J. Murphy, Flagstaff Hill (AU); Colin Hall, Brighton (AU); Rick Fabretto, Warradale (AU)

(73) Assignee: SMR Patents S.a.r.l., Luxembourg (LU)

( * ) Notice: Subject to any disclaimer, the term of this patent is extended or adjusted under 35 U.S.C. 154(b) by 609 days.

(21) Appl. No.: 11/993,759

(22) PCT Filed: Jun. 30, 2006

(86) PCT No.: PCT/AU2006/000916
§ 371 (c)(1),
(2), (4) Date: May 14, 2008

(87) PCT Pub. No.: WO2007/002989
PCT Pub. Date: Jan. 11, 2007

(65) Prior Publication Data
US 2010/0079846 A1 Apr. 1, 2010

(30) Foreign Application Priority Data

Jul. 1, 2005 (AU) ................................ 2005903481

(51) Int. Cl.
*G02F 1/153* (2006.01)
(52) U.S. Cl. ...................................................... 359/273
(58) Field of Classification Search ........... 359/265–275
See application file for complete search history.

(56) References Cited

U.S. PATENT DOCUMENTS
6,798,554 B2 * 9/2004 Hourquebie et al. ......... 359/265

FOREIGN PATENT DOCUMENTS
JP 5107566 4/1993
* cited by examiner

*Primary Examiner* — Joseph Martinez
(74) *Attorney, Agent, or Firm* — Reising Ethington P.C.

(57) ABSTRACT

An electrochromic assembly 32 is disclosed. The assembly comprises: first and second electrodes 22, 24, at least one electrode being transparent; a porous membrane 10 defining a plurality of pores, the membrane having a first refractive index and located between the electrodes 22, 24; an electrolyte filling the pores, the electrolyte having a second refractive index substantially matching the first refractive index, the electrolyte and membrane together forming a substantially transparent electrolytic layer; and at least one electrochromic layer 18 covering at part of the first electrode 22. The membrane 10 is flexible and the spacing between the electrodes 22, 24 is held substantially constant by the membrane 10. The membrane is sealed with sealant 42.

14 Claims, 8 Drawing Sheets

CHARGE CONDUCTING MEDIUM

FIELD OF THE INVENTION

The present invention relates to electrochromic assemblies and in particular to electrochromic assemblies that have the capacity to vary the amount of transmitted or reflected light.

BACKGROUND

Modern vehicles are equipped with an interior rear-view mirror which, in use, is positioned to allow the driver to view other vehicles behind his or her vehicle. During night time driving conditions, glare caused by the reflection of following vehicle headlights in these rear-view mirrors presents a problem to the driver. There is a need to reduce this glare while allowing the driver to continue to see behind the vehicle.

Known solutions to night time headlight glare have included interior rear-view mirrors that are manually manipulable between a daytime reflecting position and a night-time reflecting position. These mirrors use first and second surface reflections from prisms with a reflective coating on one surface.

Window panes are common in buildings and vehicles and usually permit light and other radiation to enter an enclosed space such as a room or the interior of a vehicle, etc. Often the intensity of light, particularly sunlight, can cause a problem if the light is very bright or the radiation heats the interior or fades materials in the interior of the room or vehicle. There is occasionally a need to reduce the intensity of light transmitted into a room or vehicle interior, etc, whilst still permitting some light to enter. Window glare can be reduced by tinting the windows, however, tinting permanently reduces the window's light transmissivity.

Other window panes may be used inside a building or vehicle to partition off an area. For example a window may partition the driver of a vehicle from his rear passengers or a window may partition a private office area from a public space. There is occasionally a need to decrease the transparency of such a window pane to increase the level of privacy to the area. Again, window tinting is unsatisfactory since there is a permanent reduction in transparency where reversibility of transparency would be preferred.

It is known that electrochromics can be used to reduce the intensity of reflected light from a vehicle rear-view mirror or, alternatively, to reduce the transmissivity of light through a window pane. An electrochrome is an inorganic or organic substance whose absorption characteristics are altered by charge or electron transfer when subjected to an applied voltage potential. This change in absorption usually gives rise to a variation in the electrochrome's colour or transparency. An electrochromic assembly typically has two electrodes and an electrochrome positioned such that it can be affected by a voltage potential applied across the electrodes which promotes charge transfer to the electrochrome. By appropriately varying the voltage potential the electrochrome's transmission characteristics can be varied. Clearly this effect can be utilised advantageously in the fabrication of windows and mirrors.

A problem with known electrochromic assemblies that use conventional liquid electrolytes is that the life-time of the assembly is relatively short compared with the life-time of the vehicle mirror or window pane. The short life span of the electrochromic assembly is attributed to the electrochemical degradation by over oxidation or over reduction of the electrochrome and/or electrodes which degrades the assembly. Replacement of the electrochromic assembly is costly and inconvenient to the user.

A further problem with known electrochromic assemblies containing liquid electrolytes is that liquid may leak from the assembly and damage the surrounding environment. This leakage may occur during normal operation or following impact e.g. during an accident. A further disadvantage of assemblies containing liquid electrolytes is that it is difficult to reduce the profile (or thickness) of the liquid containing assembly since a separator is required to separate the two electrodes so that they do not contact one another. Usually the separator is a gasket around the border of the assembly, however, it can be difficult to maintain a uniform gap between the electrodes and external or internal stresses can vary the gap between the electrodes resulting in non-uniform performance due to disruption of electric fields. This is evident in LCD displays where pressure applied externally results in discolouration of the display over a large area. This becomes especially difficult when trying to construct electrochromic assemblies which are physically large, curved within either a single plane or across two planes. This additional complexity adds to cost and manufacturability.

Another problem with known electrochromic assemblies is that the materials from which they are constructed are often hazardous to health and the environment. For example viologens are popularly used as electrochromics however viologens are toxic in contact with skin and if swallowed. Viologens also irritate the respiratory system and the skin and are toxic to aquatic organisms and may cause long-term adverse effects in the aquatic environment.

One alternative to a liquid electrolyte is a solid electrolyte. An electrochromic assembly having a solid electrolyte usually has a much longer life span than an assembly containing only a liquid electrolyte. A disadvantage of solid electrolytes is that the electrochromic layer and the solid electrolyte usually have rigid structures which must continuously expand and contract to allow ions to enter and leave the electrochromic layer. Ultimately mechanical strains develop at the interface of the electrochromic layer and the solid electrolyte resulting in overall degradation of the electrochromic assembly. In particular such assemblies exhibit a hazing or crazing due to light scattered by cracks and the colour or transparency change of the assembly is also diminished due to the resultant impeded ion flow.

Furthermore, known electrochromic assemblies can be difficult and/or costly to assemble during manufacturing which is inconvenient for efficient, cost-effective production.

Accordingly there is a need for a charge conducting medium suitable for use in an electrochromic assembly, particularly where rapid changes in the colour, transparency or reflectivity of the associated electrochrome are required.

It is an object of the present invention to provide an improved electrochromic assembly which eliminates or at least reduces some of the problems associated with the prior art discussed above.

The invention will be generally discussed in relation to dimming mirrors for use in automobiles but it is not so restricted and may be applied to other systems where a decrease in reflectivity or transmissivity of light or other radiation is required, for example only, and not limited to electrochromic glazing, ophthalmic applications, visual displays or clothing.

SUMMARY OF THE INVENTION

According to a first aspect of the invention there is provided an electrochromic sub-assembly comprising:

first and second flexible electrodes, at least one electrode being transparent;

a porous flexible membrane defining a plurality of pores, the membrane having a first refractive index and located between the electrodes; and at least one electrochromic layer, the electrochromic layer covering at least part of either the first or the second electrode, whereby the sub-assembly is flexible around a diameter of 400 millimeters and is permeable to an electrolyte having a second refractive index substantially matching the first refractive index, the electrolyte and sub-assembly together able to form a substantially transparent electrochromic assembly.

Preferably the sub-assembly is flexible around a diameter of 100 millimeters.

Preferably the assembly comprises a first electrochromic layer on a first side of the membrane and a second electrochromic layer on a second side of the membrane.

Preferably the first electrochromic layer has an absorption spectrum which is complementary to the absorption spectrum of the second electrochromic layer.

Preferably the first electrochromic layer and the second electrochrome layer have a combined absorption spectrum which is maximum across the visible spectrum when an electric potential is applied between the first and second electrochromic layers.

Preferably the first electrochromic layer and the second electrochromic layer have a combined absorption spectrum which is minimum across the visible spectrum when a reverse electric potential is applied between the first and second electrochromic layers.

Preferably the first and second electrochromic layers each comprise inherently conducting polymers.

Preferably the inherently conducting polymer comprises one or more monomer units or oligomers selected from the group including polypyrrole and its derivatives, polythiophene and its derivatives, polyaniline and its derivatives, polycarbazole and its derivatives, polyphenylene sulphide and its derivatives, polyparaphenylene and its derivatives, or polyindole and its derivatives.

Preferably the first electrochromic layer comprises a poly-3,4-alkylenedioxy-thiophene.

Preferably the second electrochromic layer is polypyrrole.

Preferably the at least one electrochromic layer further comprises a conductive additive which substantially improves the conductivity of the electrochromic layer.

Preferably the conductive additive comprises particles of indium tin oxide (ITO).

Preferably the electrodes are selected from the group including indium-tin oxide (ITO), fluorine doped tin oxide (FTO), antinomy doped tin oxide (ATO).

Preferably at least one of the electrodes defines a plurality of pores, the pores of the electrode characterised in that they allow transport of ions through the electrode.

Preferably the porous flexible membrane comprises a polymer.

Preferably the porous flexible membrane comprises polyvinylidene difluoride (PVDF).

Preferably the pores of the flexible membrane define tortuous paths through the membrane to allow the electrolyte to pass through the membrane.

Preferably the pore size of the porous membrane ranges between 50 nm to 100 μm.

Preferably the pore size of the porous membrane ranges between 0.1 μm-5 μm.

According to a second aspect of the invention there is provided an electrochromic assembly comprising:

first and second electrodes, at least one electrode being transparent;

a porous flexible polymer membrane defining a plurality of pores, the membrane having a first refractive index and located between the electrodes;

an electrolyte filling the pores, the electrolyte comprising an ionic liquid and having a second refractive index substantially matching the first refractive index, the electrolyte and membrane together forming a substantially transparent electrolytic layer;

a first electrochromic layer covering at least part of the first of the electrode; and a second electrochromic layer covering at least part of the second of the electrode, the first electrochromic layer having an absorption spectrum which is complementary to the absorption spectrum of the second electrochromic layer, wherein the spacing between the first and second electrodes is held substantially constant by the membrane.

Preferably the pore size of the porous membrane ranges between 50 nm to 100 μm.

Preferably the pore size of the porous membrane ranges between 0.1 μm-5 μm.

Preferably the electrolyte is an ionic liquid comprising 1-ethyl-3-methyl imadozolium bistrifluoromethane sulfonimide.

Preferably the at least one electrochromic layer comprises an inherently conducting polymer.

Preferably the inherently conducting polymer comprises one or more monomer units or oligomers selected from the group including polypyrrole and its derivatives, polythiophene and its derivatives, polyaniline and its derivatives, polycarbazole and its derivatives, polyphenylene sulphide and its derivatives, polyparaphenylene and its derivatives, or polyindole and its derivatives.

Preferably the first electrochromic layer comprises a poly-3,4-alkylenedioxy-thiophene.

Preferably the second electrochromic layer is polypyrrole.

Preferably the at least one electrochromic layer further comprises a performance additive selected from the group including a preservation additive, a wetting agent, a rheological additive and an antifoaming agent.

Preferably the at least one electrochromic layer further comprises a conductive additive which substantially improves the conductivity of the electrochromic layer. Preferably the conductive additive comprises particles of indium tin oxide (ITO).

Preferably the porous flexible membrane comprises polyvinylidene difluoride (PVDF).

Preferably the assembly further comprises a reflective surface, wherein the assembly forms an electrically dimmable mirror.

Preferably the reflective surface is formed by either or the first or the second electrode.

Preferably the assembly further comprises a means for varying a voltage potential between the electrodes, the variation in potential inducing a change in optical transmissivity of the assembly.

According to a third aspect of the invention there is provided a method of producing a flexible electrochromic assembly comprising the steps of:

providing a pre-formed porous flexible membrane defining a plurality of pores, the membrane having a first refractive index;

applying a first conductive material to a first side of the membrane so as to form a first electrode;

applying a second conductive material to a second side of the membrane so as to form a second electrode;

applying a first electrochromic material to the first side of the membrane; and infusing the membrane with an electrolyte, the electrolyte having a second refractive index substantially matching the first refractive index, thereby forming a substantially transparent electrochromic assembly, the assembly have an optical transmissivity that varies with voltage applied between the electrodes.

Preferably the method further comprises the step of applying a second electrochromic material to the second side of the membrane.

Preferably the step of applying a first conductive material and the step of applying a first electrochromic material are a single step forming a first single layer, wherein the first conductive and first electrochromic materials are either the same material or are a mixture of materials.

Preferably the method further comprises the step of spooling the assembly around a spool having a hub with a diameter of 400 millimeters or less.

Preferably the hub has a diameter of 100 millimeters or less.

Preferably the porous flexible membrane comprises a polymer.

Preferably the porous flexible membrane comprises polyvinylidene difluoride (PVDF).

Preferably the membrane is selected to have a pore size ranging between 50 nm to 100 µm.

Preferably the membrane is selected to have a pore size ranging between 0.1 µm-5 µm.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge.

Specific embodiments of the invention will now be described in some further detail with reference to and as illustrated in the accompanying Figures. These embodiments are illustrative, and not meant to be restrictive of the scope of the invention. Suggestions and descriptions of other embodiments may be included within the scope of the invention but they may not be illustrated in the accompanying Figures or alternatively features of the invention may be shown in the Figures but not described in the specification.

DETAILED DESCRIPTION OF ILLUSTRATIVE EMBODIMENTS OF THE INVENTION

Illustrative embodiments of the invention are illustrated in the accompanying representation in which.

Figure 1A:
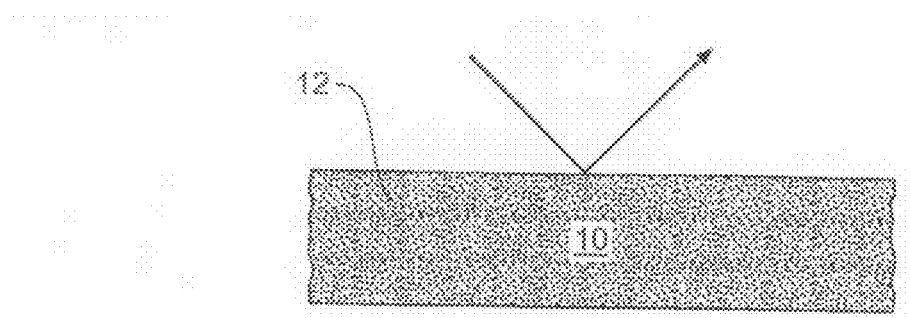
FIG. 1a is a cross-sectional schematic of the membrane according to a preferred embodiment of the present invention.

Referring to FIG. 1A, membrane 10 is a pre-formed, flexible, porous polymeric material defining a plurality of pores 12. The pores of the membrane 10 scatter light so the membrane is non-transparent in the visible region of the electromagnetic spectrum (optically opaque), the direction of light incident on the membrane is shown by the arrow in FIG. 1A. By non-transparent it is meant that up to approximately 93% of light incident on the membrane is reflected while approximately 7% of light is transmitted. The morphology of membrane 10 is described as tortuous and is effectively a loose open cell sponge type.

Figure 2A:
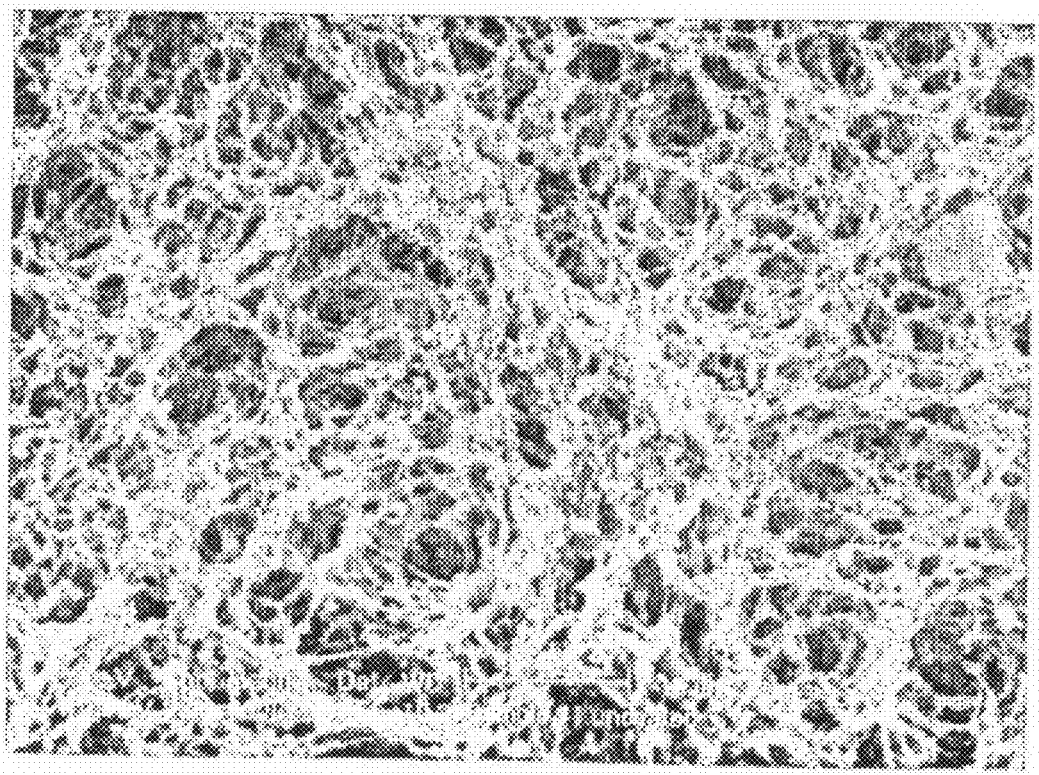
FIG. 2a is a close-up view of the membrane of FIG. 1A.

In this embodiment membrane 10 is made from the polymer polyvinylidene difluoride (PVDF) in the form of a non-hazardous, flexible, self-supporting polymeric sheet or membrane. The pores of membrane 10 have a diameter between 50 nanometers (nm)-100 microns (µm). In the preferred embodiment the average pore diameter, determined spectroscopically, ranges between approximately 0.1 micrometers and 5 micrometers (µm). FIG. 2a shows a close up of the PVDF membrane 10 used in the present arrangement.

Membrane 10 is flexible and self-supporting and contains pores or channels into which a liquid can infuse. It will be understood that any membrane which has the required mechanical properties can be used and the membrane structure need not be tortuous. Membrane 10 is also capable of supporting an electrochromic layer and/or an electrode on the surface of the membrane without a significant reduction in porosity (discussed below).

Figure 1B:
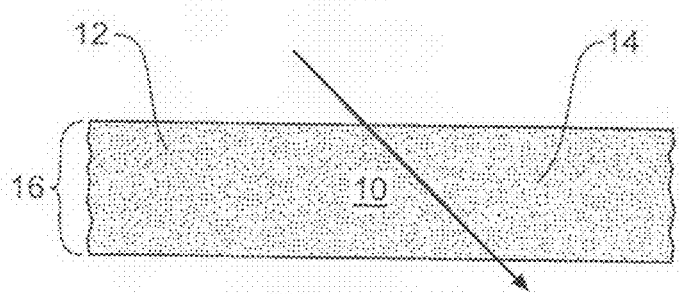
FIG. 1b is a cross-sectional schematic of the electrolytic layer according to a preferred embodiment of the present invention.

In FIG. 1B, membrane 10 includes an electrolyte 14 infused within pores 12. The tortuous path formed by the pores permits the electrolyte to pass through the membrane. However, the electrolyte is held within the membrane polymeric matrix by capillary force. Preferably the electrolyte is an ionic liquid, however it will be understood that the electrolyte can be a combination of ionic liquids, an ionic liquid and a non-inherently liquid salt such as NaCl, or ionic liquid and solvent, or any combination of these mixtures. Furthermore, the electrolyte may be a polymer having anionic or cationic functionalities. Alternatively the electrolyte can be a salt having a supporting solvent.

In the preferred embodiment the ionic liquid is 1-ethyl-3-methyl imadozolium bistrifluoromethane sulfonimide. Other suitable ionic liquids include, for example, n-butyl-n-methylpyrrolidinium bis trifluoromethane sulfonimide. Once infused, ionic liquid 14 and membrane 10 form an electrolytic layer 16. Approximately 80% by mass of the layer is ionic liquid 14. The electrolytic layer 16 is a non-toxic, flexible solid system, which functions as a charge conducting medium. The membrane contains the liquid electrolyte should there be any damage to the surrounding enclosure.

Ionic liquid 14 is selected (or otherwise adjusted) so that when it is added to membrane 10, the electrolytic layer or charge conducting medium 16 that is formed is substantially transparent. The optical opaqueness and optical transparency of the electrochromic assemblies in FIGS. 1A and 1B are shown using arrows to indicate the reflected or transmitted light. In FIG. 1A the light is reflected from the opaque surface of membrane 10 (discussed above). In FIG. 1B the light passes through the electrolytic layer 16.

Ionic liquid 14 is advantageously used without a supporting solvent and does not readily evaporate (electrolytes requiring a supporting solvent alter in concentration as solvent evaporates) even upon extended exposure to the atmosphere. Ionic liquids are ideal electrolytes since they have a high conductivity as well as a large electrochemical window (stable over potential ranges of 4 to 6 Volts and above), have fast charge carrier mobility during redox events and are non-volatile and non-flammable.

Optical transparency of electrolytic layer 16 is achieved by substantially matching the refractive indices of ionic liquid 14 and membrane 10. When ionic liquid 14 fills the pores 12 of membrane 10, air is displaced, thereby forming a substantially uniform refractive index throughout the membrane. In order to ensure a reasonably good match of refractive indices, the ionic liquid can be selected for its refractive index or the refractive index can be altered by the addition of additive such as zirconium oxide particles. The refractive index of the ionic liquid can also be altered by, for example, changing the electrolyte salt.

The transmittance of light through electrolytic layer 16 is actually enhanced compared to the transmittance of light through air. The electrolytic layer or charge conducting medium is of specular quality and provides a non-diffuse light path resulting in it being readily used without further modification in both electrochromic mirrors and in electrochromic glazing with suitably positioned electrodes (as discussed below). Furthermore, because all of the components of the layer are non-hazardous, the layer can be used in windows and mirrors without concern of leakage of fluid or damage to health or the environment through exposure.

The thickness of the electrolytic layer can be approximately 50 μm. Alternatively, the layers can be up to approximately 500 μm in thickness. In the preferred embodiment, the layer is approximately 120 μm in thickness. Since electrolytic layer 16 is very thin a thinner electrochromic assembly (thin profile) can be produced compared to prior arrangements.

Figure 3A:
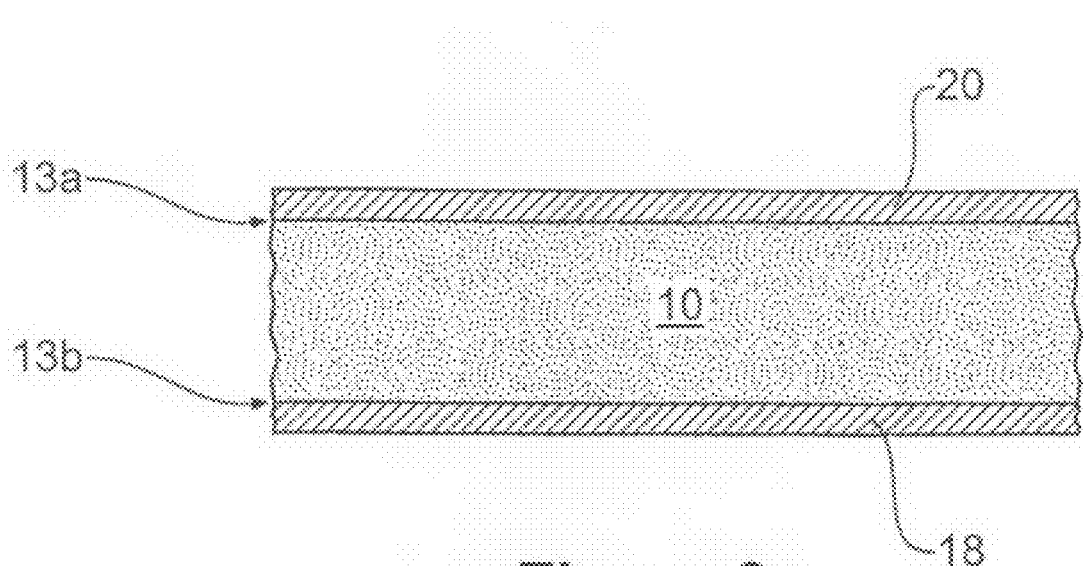
FIG. 3a is a cross-sectional schematic of the electrolytic layer of FIG. 1B having electrochromic layers thereon.
Figure 3B:
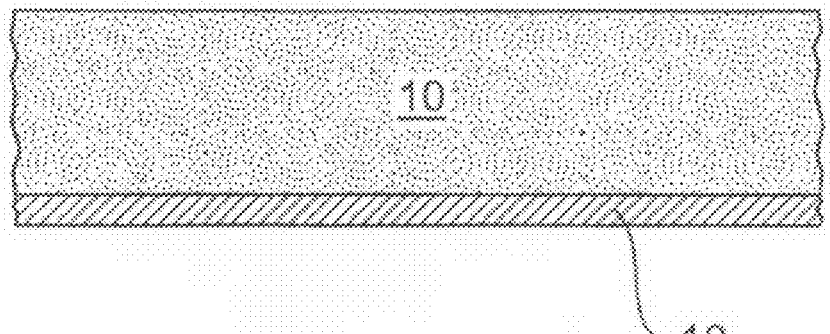
FIG. 3b is a cross-sectional schematic of the electrolytic layer having one electrochromic layer thereon, according to another embodiment of the present invention.

Referring now to FIG. 3A, membrane 10 includes an electrochrome, in the form of an electrochromic layer 18, contacting at least part of the surface 13 of membrane 10. In this embodiment a first electrochromic layer 18 contacts at least a part of a first side of membrane 10 (surface 13a) and a second electrochromic layer 20 contacts at least a part of the opposite or second side of membrane 10 (surface 13b). It will be understood, however, that one electrochromic layer contacting membrane 10 can suffice in some systems. This type of arrangement is shown in FIG. 3B. Furthermore, there may be more than one electrochromic layer on the first or second sides of the membrane as desired (not shown).

The electrochromic materials forming electrochromic layers 18 and 20 are coloured according to the frequencies of light that are absorbed by the electrochrome. The electrochromes which form the electrochromic layers 18 and 20 are selected to have absorption spectrum which are complementary to one another so that electrochromic layer 18 is anodically colouring while electrochromic layer 20 is cathodically colouring.

In this embodiment the electrochromic layers 18 and 20 comprise inherently conducting polymers (ICP) selected from the groups polythiophenes, polypyrroles, polyanilines, polyindoles, polycarbazoles, polyphoneylene sulphide and polyparaphenylene and the respective derivatives. It is an option that the compounds chosen from these groups be substituted with at least one chemical functionality. Alternatively the inherently conducting polymer may comprise copolymers, block copolymers or graft copolymers each of which may include one or more different monomers or oligomers selected from the abovementioned groups. For example, there may be a sequence of thiophene units followed by a sequence of indole or pyrrole units, etc.

The inherently conducting polymer may also comprise, in whole or in part, various other polymers not provided in the list above and/or composites may be used in addition to the monomer or oligomer unit. Occasionally the inherently conducting polymer is not inherently processable, therefore a composite such as polystyrene sulfonic acid (PSS) may be used to impart different properties to the polymer to improve its processability.

In this instance, electrochromic layer 18 is cathodically colouring and formed from polyethylenedioxy-thiophene (PEDOT) doped with polystyrene sulfonic acid (PSS). PEDOT has a low redox potential, is stable to multiple redox switching and has a high conductivity. These properties are attributed to the high electron density of the molecular structure. Other cathodically colouring electrochromes which can be used include polypropylenedioxy-thiophenes (PRODOT). Electrochromic layer 20 is anodically colouring and formed from polypyrrole (PPy). Other anodically colouring electrochromes which can be used include, for example, polyaniline. As mentioned it will be understood that there are other ICPs that can be used and indeed other types of electrochromes, such as conjugated polymers or metal oxides may be used on the surface of membrane 10.

Figure 2B:
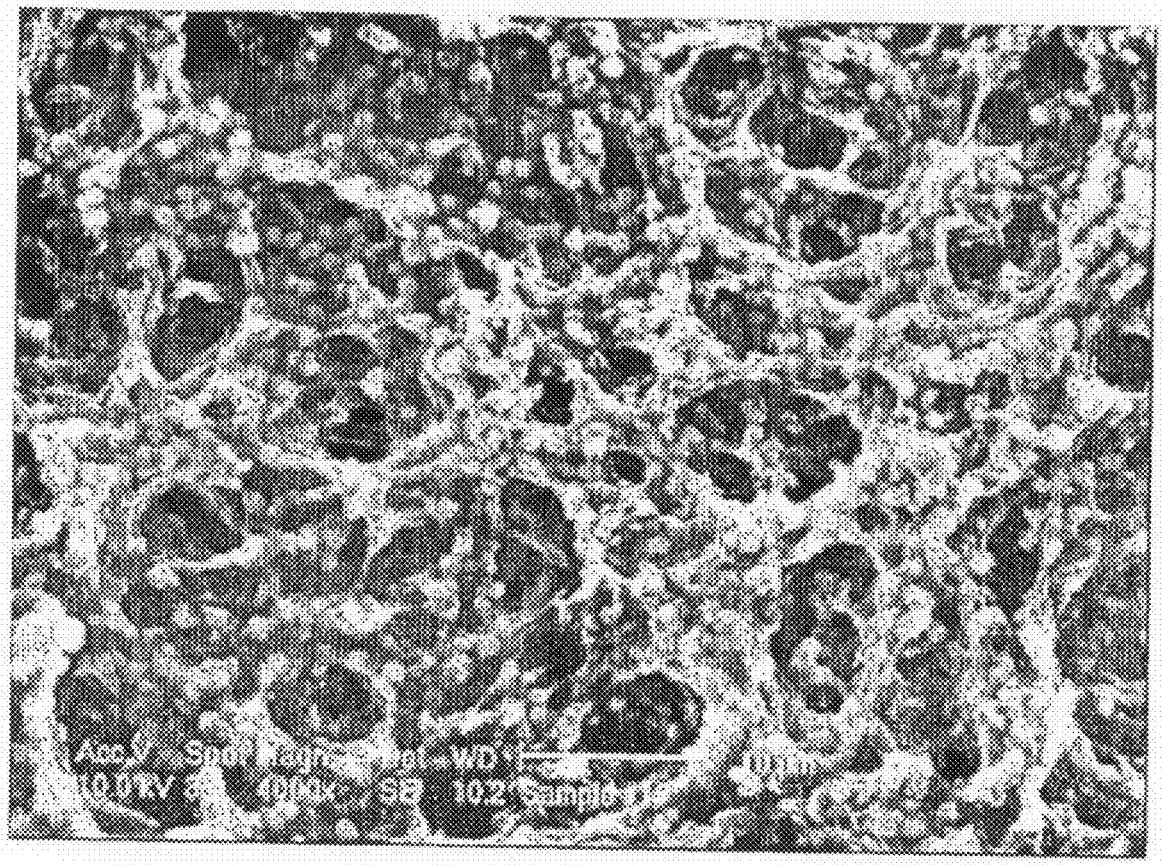
FIG. 2b is a close-up view of the membrane of FIG. 1A having electrochromic layer.

Electrochromic layers 18 and 20 are coated onto surfaces 13a and 13b using a known printing method such as ink-jet, roll/press printing, silk screening or airbrushing. The skilled addressee will appreciate that any method of contacting the electrochromes 18 and 20 onto the membrane could be used, for example, solution casting, dip coating or spin coating. Alternatively the electrochromic layers may be deposited by vacuum filtration. The electrochromic layers can form a layer on top of membrane 10 or alternatively the electrochromic layers may infuse into membrane 10. FIG. 2b is a close-up view of membrane 10 having an electrochromic layer thereon.

It is an option that performance additives be added to the inherently conducting polymers (or to other parts of the assembly) to improve the deposition process of the electrochromic layer. For example, a wetting agent, such as a non-ionic surfactant, may be used to decrease the surface tension of the solution from which the ICPs are deposited, thereby increasing the adherence of the electrochromic layer to the target substrate. Other performance additives include: preservation additives, rheological additives and/or antifoaming agents which can also be advantageously used to improve the adherence, UV stability, consistency, longevity, flexibility or deposition of the electrochromic layers.

It is an option that conductive additives are added to one or both of the ICP layers in order to improve the conductivity of the ICP. Conductive additive which may be used in the present invention include, indium tin oxide (ITO) nanoparticles. It should be understood that other additives known to improve the conductivity (and therefore the performance) of electrochromic layers could be used. If the conductive additives are sufficiently conductive, the electrochromic layer and the electrode layer will be the same layer. There will be no need to deposit an electrochromic layer and a separate electrode layer since the conductive electrochromic layer will perform both the conductivity and electrochromic functions.

Figure 4A:
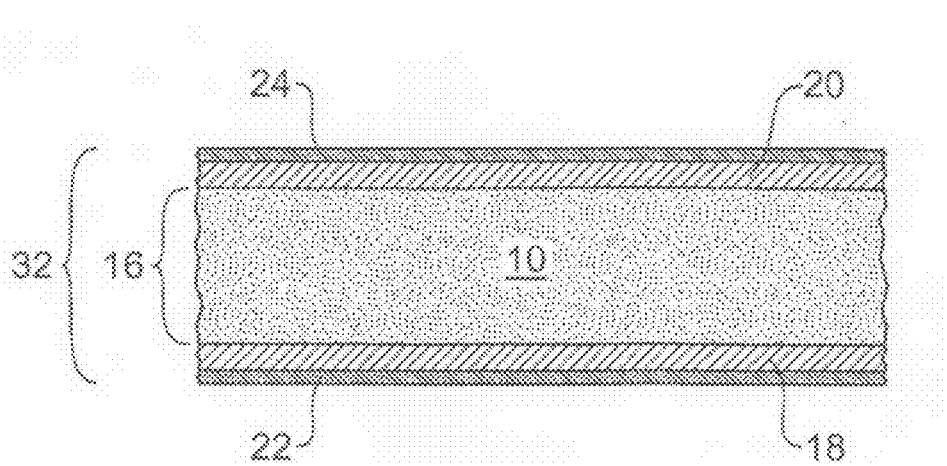
FIG. 4a is a cross-sectional schematic of the electrochromic assembly according to a preferred embodiment of the present invention.

FIG. 4A shows the electrolytic layer 16 and electrochromic layers 18 and 20 disposed between two electrodes, electrode 22 and counter-electrode 24. The PVDF membrane of the electrolytic layer (or charge conducting medium) 16 is preformed and therefore acts to evenly separate electrodes 22 and counter-electrode 24 from one another. The electrochromic assembly which forms essentially has a continuous spacer which means manufacturing is easier since the electrode separation is inherently pre-defined. The resulting assembly is also more resistive to knocks, gravity, temperature and pressure distortions.

Electrodes 22 and 24 are indium tin oxide (ITO), however any suitable substantially transparent electrode could be used, for example, fluorine doped tin oxide (FTO), antimony doped tin oxide or other conductive metal oxides or thin metal films. In the preferred embodiment the ITO electrodes are deposited onto membrane 10 on top of the electrochromic layers 18 and 20.

Figure 4B:
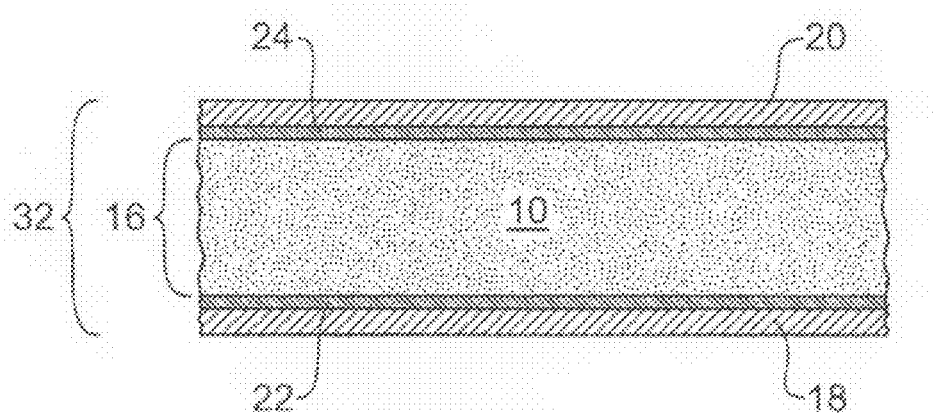
FIG. 4b is a cross-sectional schematic of the electrochromic assembly according to another embodiment of the present invention.
Figure 4C:
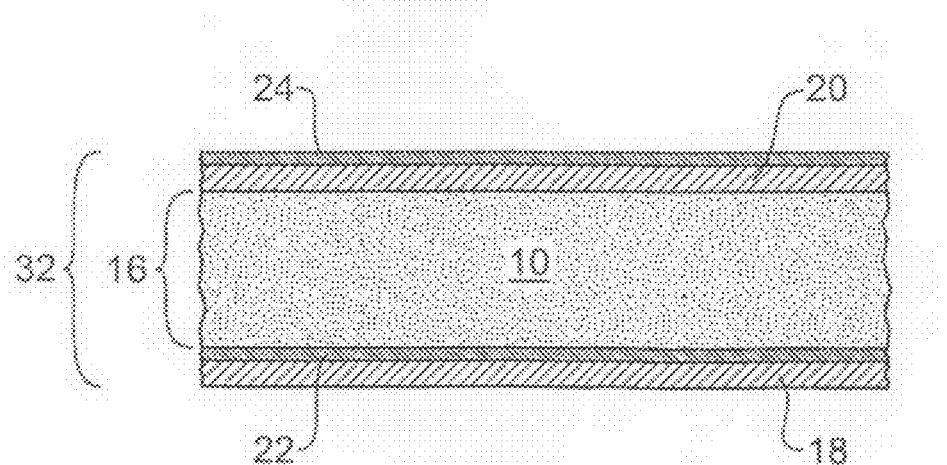
FIG. 4c is a cross-sectional schematic of the electrochromic assembly according to another embodiment of the present invention.

It is also an option that the electrodes are deposited onto membrane 10 before electrochromic layers 18 and 20 are deposited (FIG. 4B). If the electrodes are disposed between membrane 10 and electrochromic layers 18 and 20 then the electrodes are porous, transparent and flexible and can be readily deposited onto the membrane without limiting the inherent porosity of membrane 10. (If the electrodes are deposited on top of electrochromic layers 18 and 20 then they do not have to be porous). Alternatively one electrode can be sandwiched as in FIG. 4A while the other is disposed on top of the electrochromic layer as in FIG. 4B; this arrangement is shown in FIG. 4C. In all of the aforementioned arrangements, the electrodes always abut the electrochromic layer; effectively the electrochromic layer covers at least a part of the electrode.

For use in a dimming mirror, the assembly further requires the inclusion of a reflective surface. The electrochromic assembly can abut a reflective surface or a reflective surface can form an integral part of the electrochromic assembly (i.e. the reflective surface can be an electrode).

The membrane having electrochromic layers 18 and 20 and/or electrodes 22 and 24 deposited thereon (discussed above and depicted in FIGS. 4A-4C) is a flexible sub-assembly. "Flexible" means that the assembly is flexible around a diameter of 400 mm and more preferably flexible around a diameter of 100 mm. Given this flexibility, it is an option that membrane 10, having electrochromic layers 18 and 20 and/or electrodes 22 and 24 deposited thereon, be stored prior to use. For example, membrane 10 could be formed as elongate laminar sheets on a spool and then rolled for storage. Portions of membrane 10 could then be conveniently removed or cut from the roll as required. The portions of membrane 10 could then be assembled into an electrochromic assembly (discussed below). This type of storage method with its easy access to the membrane is a significant cost and time advantage from a manufacturing perspective since the rolls can be easily delivered and do not require substantial modification prior to use. It is preferable that the ionic liquid 14 be added once the sub-assembly is ready for use.

Figure 5A:
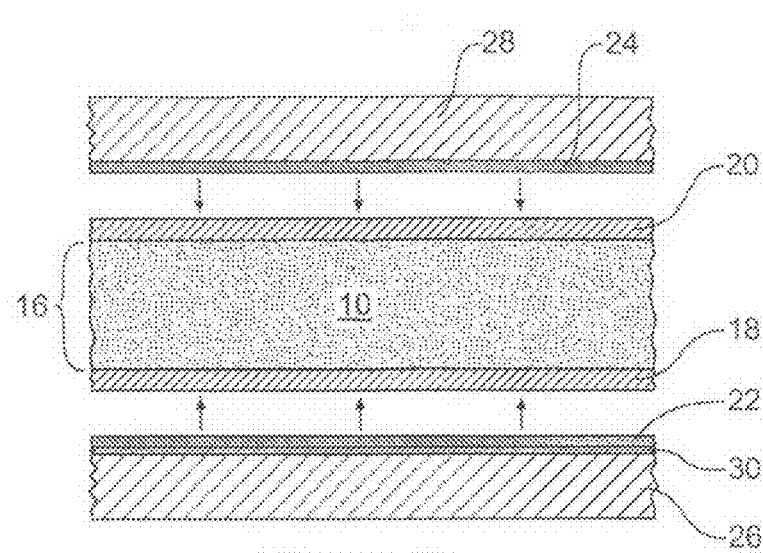
FIG. 5a is a cross-sectional schematic of the electrochromic assembly prior to assembly.
Figure 5B:
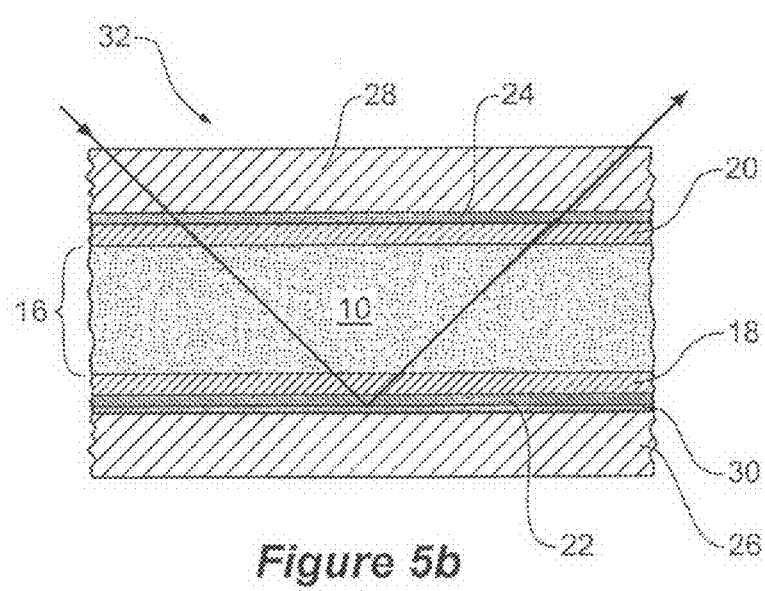
FIG. 5b is a cross-sectional schematic of the electrochromic assembly of FIG. 5a once assembled.

Alternatively the electrodes may be deposited onto suitable supports such as first sheet 26 and second sheet 28 which may be formed from plastic (PET) or glass or the like (FIG. 5A). The supports can then be pressed against the membrane having the electrochromic layers thereon and the ionic liquid infused therein (FIG. 5B). Preferably at least one of the supports has a reflective surface 30. It is an option that reflective surface 30 serve as an electrode, for example, a counter-electrode 24. Incident light reflected by the assembly is shown by the arrow.

Figure 5C:
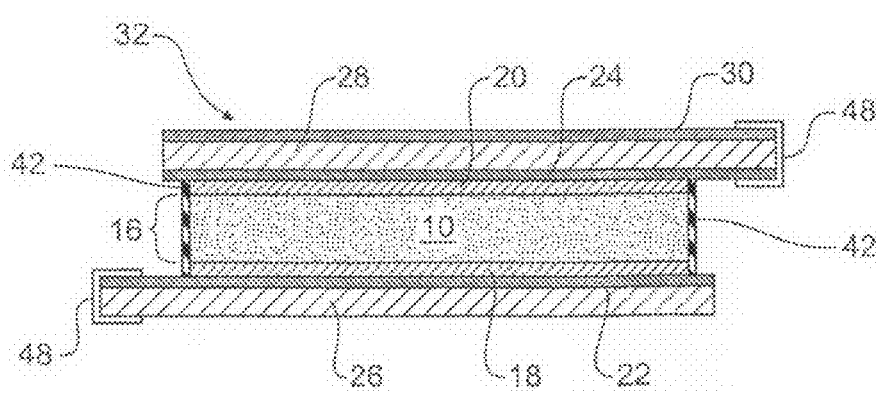
FIG. 5c is a cross-sectional schematic of the electrochromic assembly according to another embodiment of the present invention.

FIG. 5C shows the reflective surface 30 on the outside of the assembly according to an alternative embodiment of the present invention. The sealing of the membrane with sealant 42 (such as epoxy resin) can also be seen. Furthermore, busbars 48 are shown allow the assembly to have a potential applied to the electrodes.

In yet another alternative, the electrodes 22 and 24 and electrochromic layers may be deposited onto suitable supports (or sheets) such as plastic or glass. It should be understood that the electrodes and electrochromic layers may be deposited in any order, for example, electrode first then electrochromic layer on top (or vice versa) (not shown). The supports can then be pressed against the electrolytic layer thereby forming the sandwich type or layered structure shown in FIG. 5B. The electrolytic layer can be sealed between the supports. In this case, as is described above, it may be advantageous to add a conducting layer of particles, for example, nanoparticles, between the ICP and electrode layers so as to enhance the electrical contact between the ICP and electrode.

The materials from which the electrochromic assembly is formed are not hazardous to health or the environment. The distance between the electrodes in the present arrangement is uniformly maintained by the electrolytic and/or electrochromic layers disposed between the electrode. The present arrangement therefore does not suffer to the same extent from the problems faced in LCD displays since external and internal stresses in the present arrangement do not substantially effect the uniformity of the electric fields in the assembly since the spacing between the electrodes cannot be substantially changed. The assembly can rely on the supporting nature of the pre-formed membrane to support it internally, and prevent distortion and loss of functionality from physical stress.

The resulting layered structure comprising electrolytic layer 16, having electrochromic layers 18 and 20 thereon, disposed between electrodes 22 and 24 makes up an electrochromic assembly 32. Electrochromic assembly 32 is optically transparent, an optical transmission path being formed between the electrodes and the reflective surface. The arrow in FIG. 5 shows that incident light which enters the electrochromic assembly passes through electrolytic layer 16, through the electrochromic layers 18 and 20, through electrode 22 and counter-electrode 24 and is reflected from reflective surface 30. (For the purposes of FIG. 5 it is assumed that the electrochromic layers are not substantially interfering with the light path).

The electrochromic assembly 32 is a self-contained, self-supporting, multi-layered assembly and can be formed in any suitable shape for use.

The application of a potential across electrode 22 and counter-electrode 24 causes a current to flow between the electrodes. Charge carriers (i.e. ions or electrons) move from one electrochromic layer 18 or 20 to the other (18 or 20), the oxidation or reduction of the electrochrome effecting the absorption spectra and therefore the colour of the two electrochromes.

The first electrochromic layer and the second electrochrome layer are selected (described above) to have a combined absorption spectrum which is maximum across the visible spectrum when an electric potential is applied between the first and second electrochromic layers. When a reverse electric potential is applied between the first and second electrochromic layers the layers have a combined absorption spectrum which is minimum across the visible spectrum. Electrolytic layer 16 is substantially transparent, therefore this colour change is visible to the user.

Ideally the anodically colouring electrochromic layer 20 is transmissive to a major portion of the visible spectrum in its reduced form. Upon oxidation, absorption is induced in the visible region resulting in at least a partially coloured state. A complementary cathodically colouring electrochromic layer 18 is then chosen which is transmissive and only lightly coloured when oxidised. Reduction of the oxidised form returns the cathodically colouring electrochromic layer 18 to a coloured state.

The application of a potential to the electrochromic assembly thereby provides a dimming condition for the electrochromic assembly. The optical transmissivity varies with the voltage applied between the electrodes. The electrochromic assembly has a good open circuit memory and therefore a particular electrochromic condition is substantially maintained constant for a period of time when the external voltage potential is removed.

For safety purposes, a means is also provided for returning the electrochromic assembly to the non-dimming condition in the event of electrical failure. This means can be an electrical switch which applies the required voltage potential between the electrodes in order to provide a non-dimming condition. This safety feature is particularly useful in vehicle mirror systems where it is preferable that the vehicle mirror be in the non-dimmed state by default.

The dual electrochromic arrangement allows the device to switch between highly transmissive and highly absorptive states as a function of applied voltage potential. The dual nature of the system also permits a reduction in the potential (by approximately 1 Volt) that is applied in order to effect a colour change in the electrochromic assembly 32. A reduction in the voltage potential applied improves the life time of the assembly 32.

It is known that both the cations and anions of ionic liquid 14 enter electrochromic layers 18 and 20. Ionic liquid 14 facilitates the oxidation and reduction of the electrochromes in electrochromic layers 18 and 20. For example, following oxidation a cation is expelled with the anion remaining to balance charge.

In prior arrangements the movement of counter-ions through the electrochromic assembly caused a number of problems including cracking and delamination as well as slow response times due to impeded ion flow. In the present arrangement the use of the flexible electrolytic layer 16 in combination with electrochromic layers 18 and 20 provides a system which does not exhibit cracking or delamination. The electrochromic layers 18 and 20 are porous and the counter-ions or charge carriers have a high degree of mobility attributable to the electrochromes open polymer morphology.

The structure of membrane 10 does not impede charge carrier flow providing further elasticity to the whole arrangement. The flexibility and internal structure of the present arrangement further provides for uninhibited ion flow i.e. faster charge carrier flow within electrochromic assembly 32 than is observed in prior arrangements. By "uninhibited flow" it is meant that the ions freely flow within the membrane so that it has relatively fast response time for changes in transmissivity upon application of an applied potential and does not suffer from the slow response times often attributed to standard solid electrolyte systems.

The presence of membrane 10 actually increases the electrical conductivity of the electrolyte. This is because ionic liquids do not conduct electricity via the direct migration of ions. Rather the conductivity process is due to small displacements of ions, which forms "holes" that have net charge. When a counter ion moves into the hole to balance the charge, it forms (from its previous position) another hole, which is balanced by another counter ion and so the process continues. It is thought that the presence of a large surface area material, such as PVDF, increases the probability of hole formation by forming regions of higher energy, or preserving high energy regions, and hence the charge carrying properties of the system are enhanced.

Table 1 below shows the bulk solution resistance, $R_s$, of the ionic liquid in Ohm/cm$^2$ CPE and Rp are parameters derived from ionic liquid interaction with the test cell. The system was modelled using an equivalent circuit, with Rs, the solution resistance, in series with Rp (interface resistance) and CPE (Constant Phase Element, or leaky capacitor) which themselves were in parallel.

TABLE 1 showing the resistance and capacitance of the ionic liquid used without a membrane.

Ionic liquid only (No Membrane)

| Variable | Value | % Error |
| --- | --- | --- |
| Rs | 18.14 | 0.82511 |
| CPE1-T | 1.45E−04 | 1.018 |
| CPE1-P | 0.86886 | 0.27109 |
| Rp | 1.07E+05 | 2.6327 |

Table.2 below shows the resistance, $R_s$, of the electrolytic layer or charge conducting medium (i.e. the PVDF membrane infused with the ionic liquid) in Ohm/cm$^2$.

TABLE 2 showing the resistance and capacitance of the ionic liquid infused into the membrane.

Ionic liquid infused into the membrane

| Variables | Value | % Error |
| --- | --- | --- |
| Rs | 13.7 | 0.82511 |
| CPE1-T | 7.47E−05 | 1.018 |
| CPE1-P | 0.90083 | 0.27109 |
| Rp | 94739 | 2.6327 |

It is clear that the resistance, $R_s$, is lower when the membrane is infused with ionic liquid (compared to that measured for the ionic liquid alone). Effectively, therefore, the membrane increases the electrical conductivity of the ionic liquid and does not inhibit ion movement.

Figure 8:
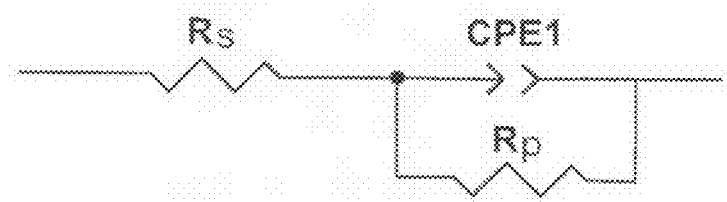
FIG. 8 is a schematic of impedance measurements performed on the membrane (both with and without ionic liquid infused in the pores)
Figure 9A:
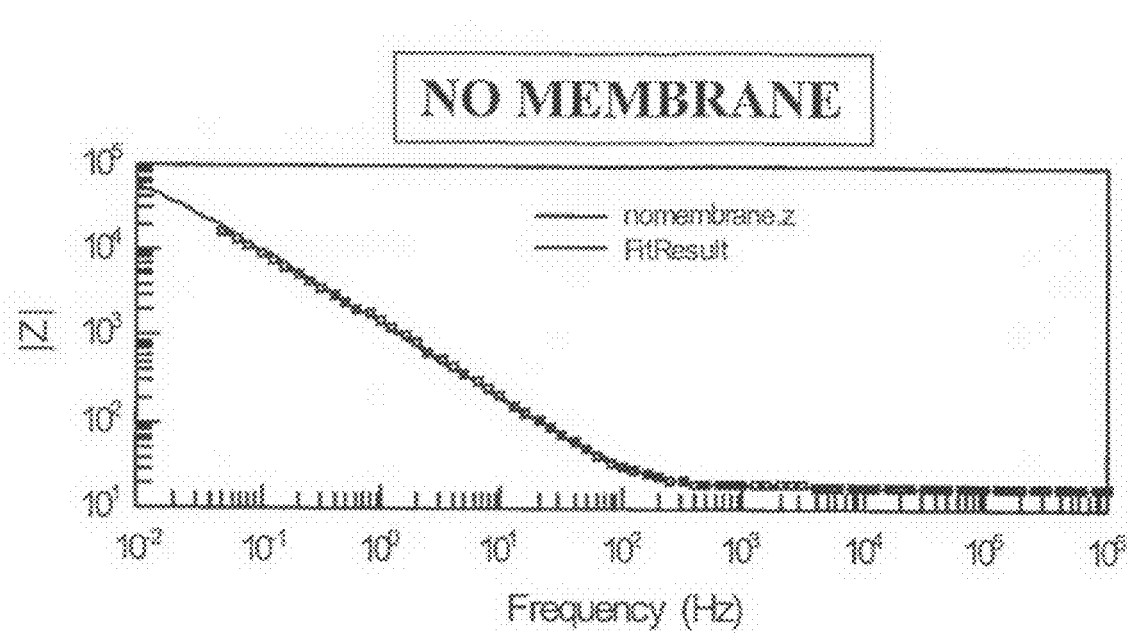
FIG. 9a is a Bode plot of the measurements performed on the ionic liquid (i.e. no membrane)
Figure 9B:
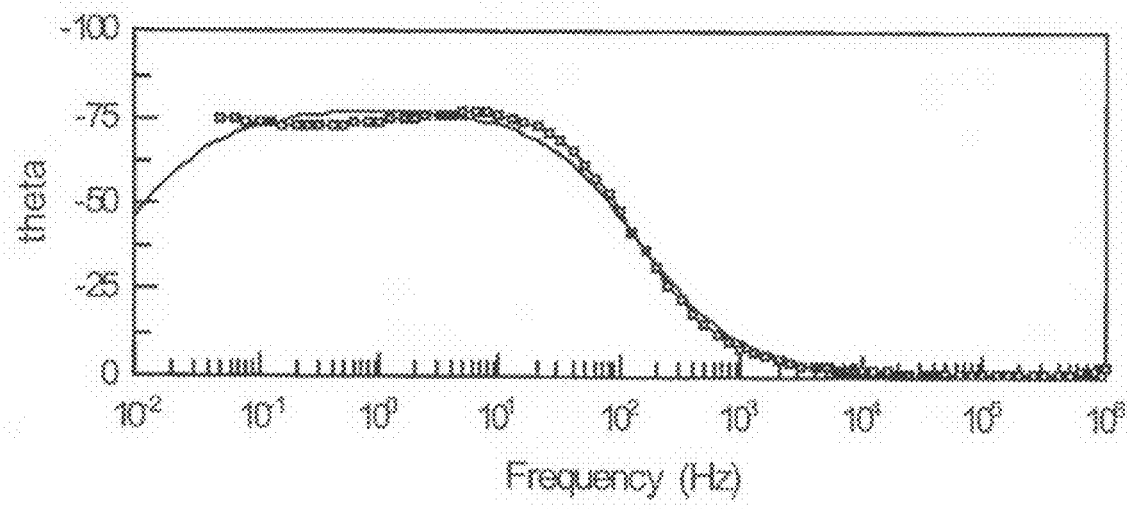
FIG. 9b is a Bode plot of the measurements performed on the ionic liquid (i.e. no membrane)
Figure 10A:
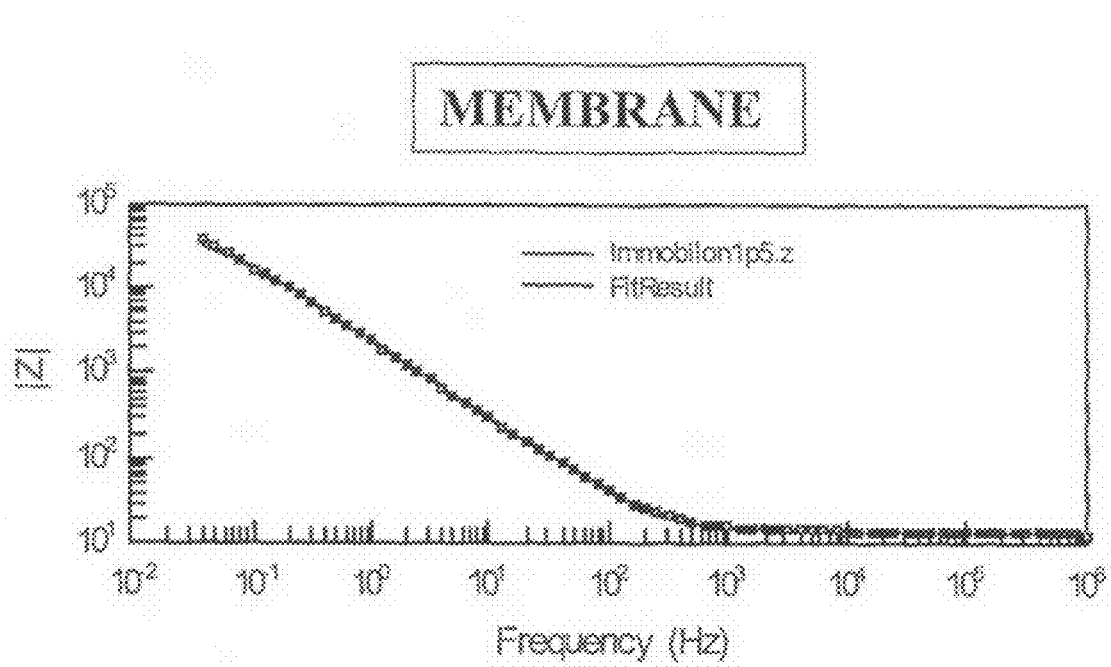
FIG. 10a is a Bode plot of the measurements performed on the membrane infused with ionic liquid.
Figure 10B:
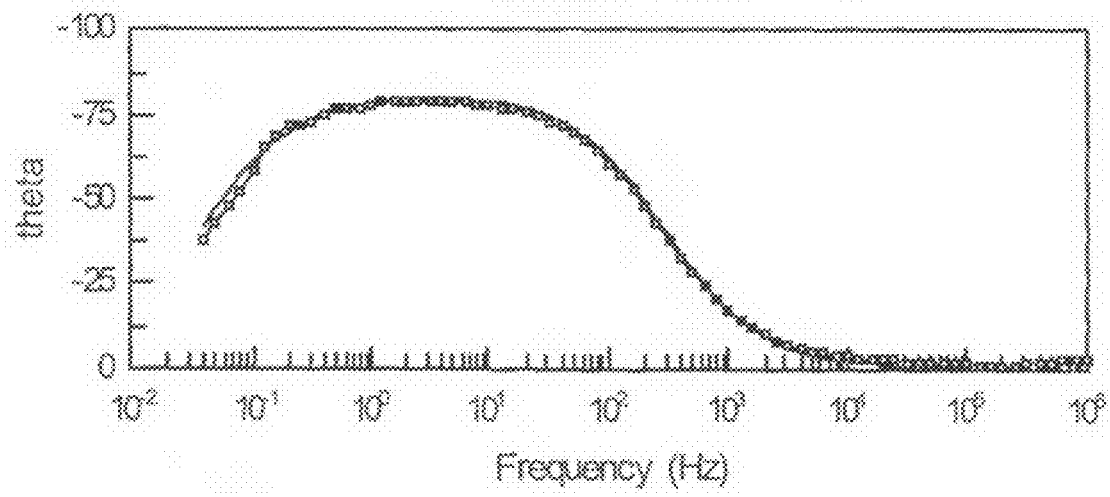
FIG. 10b is a Bode plot of the measurements performed on the membrane infused with ionic liquid.

FIG. 8 is a schematic of the variables measured in Tables 1 and 2. FIGS. 9a and 9b are Bode plots using the variable of Table 1 and FIGS. 10a and 10b are Bode plots of the variable using the variable of Table 2.

The membrane is pre-formed (i.e. is provided without the electrochromic and/or electrode layers and without the ionic liquid infused therein). The pore size of the membrane is selected so as to allow uninhibited charge carrier and ion flow in both directions and the ions are not impeded or inhibited by any charge within membrane 10 itself. The response time of the system is of the order of seconds (approximately 1 second) to change from dimming to non-dimming conditions (i.e. transmissive and non transmissive).

Figure 7:
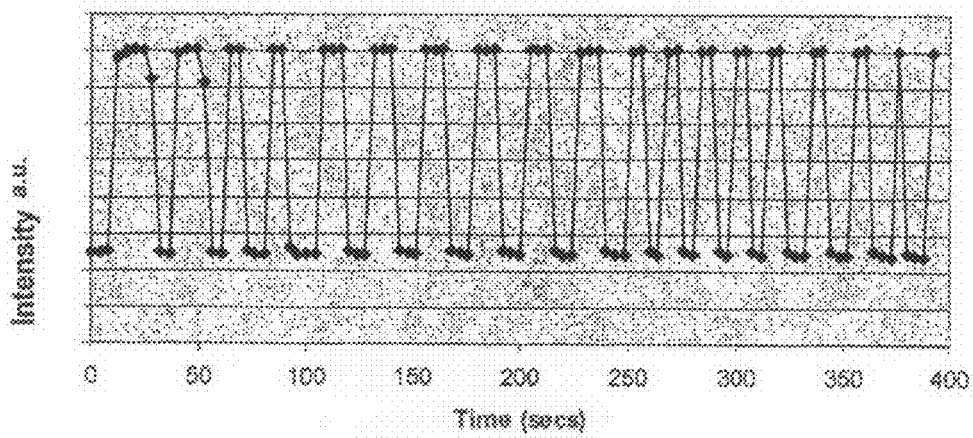
FIG. 7 is a graph showing the change in transmissivity of the electrochromic assembly over a number of cycles.

FIG. 7 shows the change in the transmissivity of the assembly (the intensity of light transmitted in arbitrary units (a.u.) over a number of cycles. A cycle is the application of a potential and then reversal of the potential. The time taken to either dim to 90% of its final dark state or lighten to 90% of its final light state, in both cases these response times (shown on the graph of FIG. 7) are approximately 1 second.

This is at least an order of magnitude quicker than prior art arrangements. Furthermore, the present arrangement has a life-time which is at least one order of magnitude greater than prior art arrangements.

By selecting intermediate potentials the colour of the electrochrome can be altered from dimming, non-dimming as well as variable tints in between. The present arrangement is therefore readily controllable and can be dimmed in correlation with the intensity of the incident light.

Figure 6:
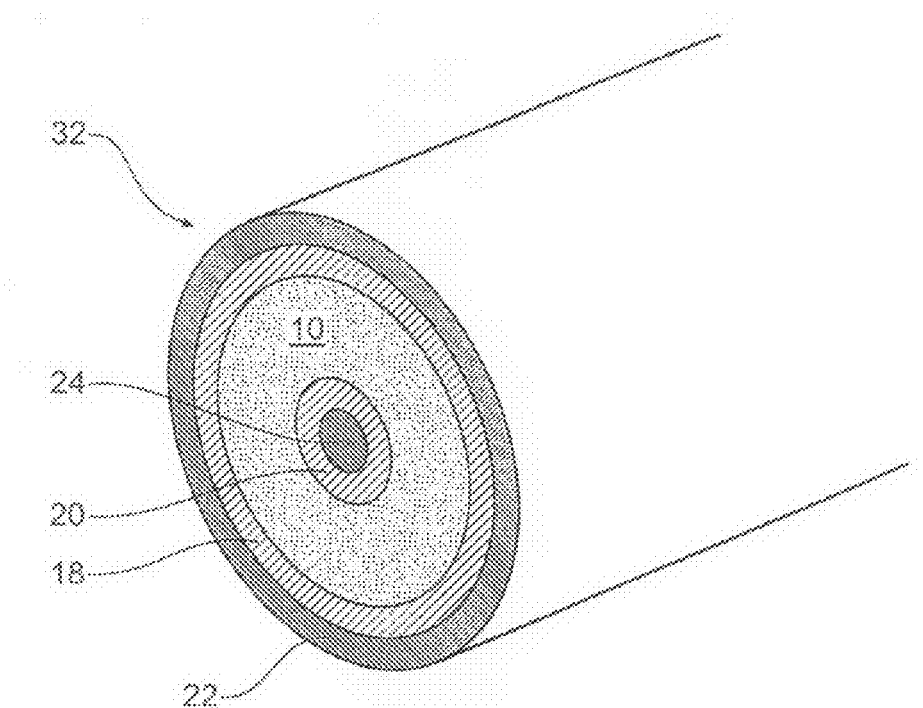
FIG. 6 is a cross-sectional schematic of the electrochromic assembly according to another embodiment of the present invention.

The invention has been described as a layered-type structure forming a sheet or a membrane, however, the assembly may also be provided as an electrochromic wire or fibre. FIG. 6 shows another aspect of the invention in which the PVDF is disposed between electrochromic layers 18 and 20 and electrodes 22 and 24 in an annular arrangement. The result is an electrochromic wire or fibre which can be of any desired length. Once ionic liquid is added to the wire or fibre the electrochromic assembly that is formed works in substantially the same was as the sheet-type structure as herein described. The skilled person will understand that other configurations that would work in a similar way to these described are also intended to be within the ambit of this invention.

The invention also provides a method of producing an electrochromic sub-assembly and/or assembly. For preparing the sub-assembly, the method includes providing a pre-formed porous flexible membrane and applying a first conductive material to a first side of the membrane and a second conductive material to a second side of the membrane. The conductive material is ITO as discussed above. The method also include applying a first electrochromic material to the first side of the membrane and a second electrochromic material to the second side of the membrane. The conductive materials and electrochromic materials can be applied in any order.

Once the layers have been applied, the membrane is infused with a electrolyte to thereby forming a substantially transparent assembly (as discussed above), the assembly has an optical transmissivity that varies with voltage applied between the electrodes.

It is an option that the electrochromic layer and electrode layers are deposited onto first and second transparent sheets or supports. (It is an option as discussed above that the electrochromic layer be sufficiently conductive by the addition of conductive additive so that a separate electrode layer is not required). The supports once prepared can sandwich the porous flexible membrane 10 which can be made substantially transparent and charge conducting as described above by infusing the membrane with a ionic liquid having a matching refractive index. Once formed, the membrane and electrolyte of the assembly are preferably sealed, for example, with epoxy resin, between the supports before a potential is applied across the assembly to vary the optical transmissivity. Other suitable sealants could be used, for example polyurethane glue.

The present arrangement has use in electrochromic mirrors, for altering the intensity of reflected light, incident upon the mirror. Mirrors which are capable of reversibly dimming may be used in the automotive industry. In addition, the arrangement could be used in electrochromic glazing where a change in colour or transmissivity of an assembly can provide a dimming condition to a window or other type of screen. This dimming can increase the level of privacy to an area as well as control the level of radiant heat that permeates an area. Electrochromic glazing may be used in many industries including the automotive industry, architectural, industrial and aeronautical industries, etc.

The electrochromic assembly of the present invention may also have applications in visual displays for example, in projector light modulators which may improve upon current LCD projector technology. The visual displays incorporating the present invention could be used in advertising. Manipulation of electric fields may allow an advert to be displayed on an electronic billboard. The advert could be readily replaced by varying the electric potential thereby providing the ability to display a number of advertisements on one billboard. Furthermore the dimming of the electrochromic assembly may be advantageously used in the ophthalmics industry. The tint and colour of lenses could be manually or automatically adjusted in order to modify the amount of light transmitted to the eyes.

Any industry which benefits from colour and/or reflectivity changes in the visible spectrum may make use of this technology. Colour control may have applications in the fashion industry where flexible laminates or woven fibres comprising the present system may provide a multitude of different colours in fabrics, jewelry and make-ups. It is also an option that the changes in colour be used for internal furnishing, for example, wallpaper which can change colour upon application of an applied potential.

Various means can be provided for controlling the potential applied to electrochromic assembly 32 so as to provide various dimming and non-dimming conditions. This is particularly advantageous in a vehicle rear-view mirror where activation is required when headlights cause glare in the mirror. For instance, a photoelectrical switching device in the form of a photodiode, phototransistor or photocell such as an LDR can be used as a control means input. When the photoelectric switch senses the headlights of a following vehicle, the control means can be activated to provide a potential across the electrodes. Photovoltaic cells and power storage devices such as batteries may also be employed, for instance to provide self-powered dimmable mirrors. Various other components and control means can also be used.

EXAMPLES

Example 1

In one example of the present invention a glass support (measuring 30 cm×30 cm) with a thin ITO film acting as an electrode and a metallic strip (indium solder) running down one edge, making up the first electrode had poly(3,4-ethylenedioxythiophen)/poly(styrenesulfonate), Aldrich Cat no. 483095 (PEDOT) airbrushed onto it.

A second glass support (measuring 30 cm×30 cm) with an ITO electrode with another metallic strip (indium solder) running down one edge had Polypyrole (PPY) airbrushed on. The loading of the conducting polymers on the electrodes was determined via transmission measurement of the individual electrodes in a spectrophotometer (Hunterlab Colorquest XE). For PEDOT an optimum loading corresponded to 55% photopic transmission and for PPY an optimum loading corresponded to a photopic transmission of 60%. It has been determined, through Transverse Electron Microscopy that this equates to film thicknesses around 100 nm.

The electrodes were brought together around the PVDF (polyvinylidene difluoride) membrane infused with ionic liquid (1-ethyl-3-methyl imadozolium bistrifluoromethane sulfonimide).

The assembly was sealed with a two part epoxy resin. A potential of 1.5V was applied to the metallic strips (busbars). A substantial uniform darkening occurred on reversal of the potential a substantial uniform lightening occurred.

FIG. 7 shows the change in the transmissivity of the cell (the intensity of light transmitted in arbitrary units (a.u.) over a number of cycles (a cycle being application of a potential and then reversal of the potential). The assembly can be characterised by its response time: that is the time taken to either darken to 90% of its final dark state or lighten to 90% of its final light state, in both cases these response times (shown on the graph of FIG. 7) are approximately 1 second.

In addition, when the potential is removed, the cell returns very slowly (approximately 3 hours) to an intermediate state. This memory is advantageous as it means the assembly will consume very little power to maintain its desired state.

Example 2

In another example of the present invention a glass support (measuring 10 cm×10 cm) with an ITO electrode and a metallic strip running down one edge, making up the first electrode had PRODOT deposited on it. A second glass support had Polyanline airbrushed onto it.

The electrodes were brought together around the PVDF (polyvinylidene difluoride) membrane infused with ionic liquid (1-ethyl-3-methyl imadozolium bistrifluoromethane sulfonimide).

The assembly was sealed with a two part epoxy resin. A potential of 1.5V was applied to the metallic strips (busbars). A substantial uniform darkening occurred and on reversal of the potential a substantial uniform lightening occurred. The response time for each transition was in the order of 1 second.

Example 3

In another example of the present invention a polyethylene terephthalate support (measuring 7 cm×7 cm) with an ITO electrode and a metallic strip running down one edge had PEDOT airbrushed on. The second support (measuring 7 cm×7 cm) also with a metallic strip had PPY airbrushed onto it.

The electrodes were brought together around the PVDF (polyvinylidene difluoride) membrane infused with ionic liquid (1-ethyl-3-methyl imadozolium bistrifluoromethane sulfonimide).

The assembly was sealed with polyurethane glue and a potential of 1.5V was applied to the metallic strips (busbars).

A uniform darkening occurred on reversal of the potential a uniform lightening occurred. The assembly was flexed around a diameter of approximately 100 mm and continued to operate.

Example 4

In another example of the present invention a PVDF membrane had substantially transparent and conducting ITO electrodes sputtered on to either side. The two electrodes were electrically isolated from each other by the membrane. A conductive epoxy resin was applied to each side of the PVDF membrane such that it ran down one edge and formed a busbar. Wires were joined to each of the busbars via conductive epoxy resin.

A layer of PEDOT was airbrushed onto one side (a first side) of the membrane and PPY onto the other (a second side). In this way intimate contact between the conducting polymer and the electrode could be achieved.

The membrane was infused with ionic liquid (1-ethyl-3-methyl imadozolium bistrifluoromethane sulfonimide) to form the electrolytic layer (or charge conducting medium). The assembly was then supported between two glass plates and sealed using a two part epoxy resin.

On application of a potential the assembly became substantially dark and on reversal of the potential the assembly become substantially clear.

While the present invention has been described in terms of preferred embodiments in order to facilitate a better understanding of the invention, it should be appreciated that various modifications can be made without departing from the principles of the invention. Therefore, the invention should be understood to include all such modifications within its scope.

The invention claimed is:

1. An electrochromic assembly comprising:
   first and second electrodes, at least one electrode being transparent;
   a porous flexible polymer membrane defining a plurality of pores, the porous flexible polymer membrane having a first refractive index and located between the electrodes;
   an electrolyte filling the pores, the electrolyte including an ionic liquid and having a second refractive index substantially matching the first refractive index, the electrolyte and membrane together forming a substantially transparent electrolytic layer;
   a first electrochromic layer covering at least part of the first electrode; and
   a second electrochromic layer covering at least part of the second of the electrode, the first electrochromic layer having an absorption spectrum which is complementary to the absorption spectrum of the second electrochromic layer,
   wherein the spacing between the first and second electrodes is held substantially constant by the porous flexible polymer membrane.

2. An electrochromic assembly according to claim 1, wherein the electrolyte is an ionic liquid comprising 1-ethyl-3-methyl imadozolium bistrifluoromethane sulfonimide.

3. An electrochromic assembly according to claim 1, wherein the at least one electrochromic layer comprises an inherently conducting polymer.

4. An electrochromic assembly according to claim 3, wherein the inherently conducting polymer comprises one or more monomer units or oligomers selected from the group including polypyrrole and its derivatives, polythiophene and its derivatives, polyaniline and its derivatives, polycarbazole and its derivatives, polyphenylene sulphide and its derivatives, polyparaphenylene and its derivatives, or polyindole and its derivatives.

5. An electrochromic assembly according to claim 1, wherein the at least one electrochromic layer further comprises a performance additive selected from the group including a preservation additive, a wetting agent, a rheological additive and an antifoaming agent.

6. An electrochromic assembly according to claim 1 wherein the at least one electrochromic layer further comprises a conductive additive which substantially improves the conductivity of the electrochromic layer.

7. An electrochromic assembly according to claim 1 further comprising a reflective surface, wherein the assembly forms an electrically dimmable mirror.

8. An electrochromic assembly according to claim 7, wherein the reflective surface is formed by either of the first or the second electrode.

9. An electrochromic assembly according to claim 8, wherein the assembly further comprises a means for varying a voltage potential between the electrodes, the variation in potential inducing a change in optical transmissivity of the assembly.

10. A method of producing a flexible electrochromic assembly comprising the step of:
provide a pre-formed porous flexible membrane defining a plurality of pores, the membrance having a first refractive index;
applying a first conductive material to a first side of the membrane so as to form a first electrode;
applying a second conductive material to a second side of the membrane so as to form a second electrode;
applying a first electrochromic material to the first side of the membrane'
infusing the membrane with an electrolyte, the electrolyte having a second refractive index substantially matching the first refractive index,
thereby forming a substantially transparent electrochromic assembly, the assembly have an optical transmissivity that varies with voltage applied between the electrodes,
spooling the assembly around a spool to create a cylinder.

11. A method of producing an electrochromic assembly according to claim 10 further comprising the step of applying a second electrochromic material to the second side of the membrane.

12. A method of producing an electrochromic assembly according to claim 10 wherein the step of applying a first conductive material and the step of applying a first electrochromic material are a single step forming a first single layer,
wherein the first conductive and first electrochromic materials are either the same material or are a mixture of materials.

13. A method according to claim 12 wherein the porous flexible membrane comprises polyvinylidene difuloride (PVDF).

14. A method according to claim 13 wherein the hub has a diameter less than 400 millimeters.

* * * * *